United States Patent
Ghouti et al.

(10) Patent No.: US 8,332,651 B2
(45) Date of Patent: Dec. 11, 2012

(54) METHOD OF GENERATING A PASSWORD PROTOCOL USING ELLIPTIC POLYNOMIAL CRYPTOGRAPHY

(75) Inventors: Lahouari Ghouti, Dhahran (SA); Mohammad K. Ibrahim, Leicester (GB); Adnan A. Gutub, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 478 days.

(21) Appl. No.: 12/656,902

(22) Filed: Feb. 18, 2010

(65) Prior Publication Data
US 2011/0202773 A1 Aug. 18, 2011

(51) Int. Cl.
*G06F 21/00* (2006.01)
(52) U.S. Cl. .............................. 713/183; 713/189
(58) Field of Classification Search .................... None
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 6,816,594 B1 | 11/2004 | Okeya | |
| 7,308,469 B2 | 12/2007 | Harley et al. | |
| 2003/0072443 A1 | 4/2003 | Harley et al. | |
| 2006/0285682 A1* | 12/2006 | Sarangarajan et al. | 380/28 |
| 2008/0080710 A1 | 4/2008 | Harley et al. | |
| 2008/0215658 A1 | 9/2008 | Gura et al. | |
| 2009/0136022 A1 | 5/2009 | Langendoerfer et al. | |
| 2010/0166175 A1* | 7/2010 | Ghouti et al. | 380/28 |
| 2010/0166176 A1* | 7/2010 | Ghouti et al. | 380/29 |
| 2010/0169644 A1* | 7/2010 | Ghouti et al. | 713/169 |
| 2010/0177890 A1* | 7/2010 | Ghouti et al. | 380/30 |
| 2011/0200185 A1* | 8/2011 | Ghouti et al. | 380/28 |
| 2011/0200187 A1* | 8/2011 | Ghouti et al. | 380/43 |
| 2011/0200188 A1* | 8/2011 | Ghouti et al. | 380/43 |
| 2011/0202773 A1* | 8/2011 | Ghouti et al. | 713/183 |
| 2012/0057695 A1* | 3/2012 | Lazich et al. | 380/28 |

FOREIGN PATENT DOCUMENTS

| | | |
|---|---|---|
| EP | 0874307 | 10/1998 |
| EP | 0892520 | 1/1999 |
| EP | 1215642 | 6/2002 |

* cited by examiner

*Primary Examiner* — Jeffrey Pwu
*Assistant Examiner* — Nega Woldemariam
(74) *Attorney, Agent, or Firm* — Richard C. Litman

(57) ABSTRACT

The method of generating password protocols based upon elliptic polynomial cryptography provides for the generation of password protocols based on the elliptic polynomial discrete logarithm problem. It is well known that an elliptic polynomial discrete logarithm problem is a computationally "difficult" or "hard" problem.

5 Claims, 1 Drawing Sheet

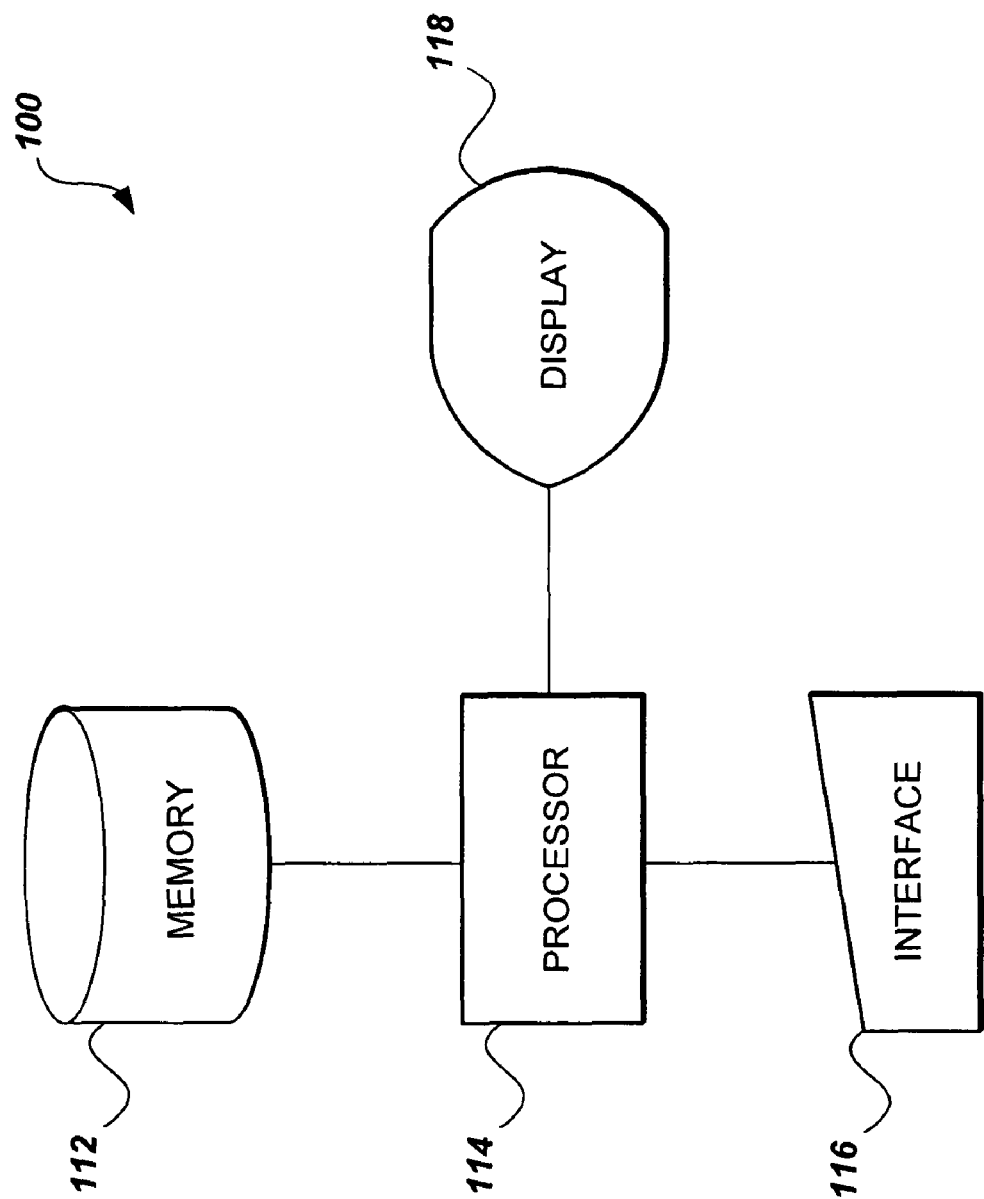

METHOD OF GENERATING A PASSWORD PROTOCOL USING ELLIPTIC POLYNOMIAL CRYPTOGRAPHY

BACKGROUND OF THE INVENTION

1. Field of the Invention

The present invention relates to computerized cryptographic methods for communications in a computer network or electronic communications system, and particularly to a method of generating a password protocol using elliptic polynomial cryptography.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Methods of adapting discrete-logarithm based algorithms to the setting of elliptic polynomials are known. However, finding discrete logarithms in this kind of group is particularly difficult. Thus, elliptic polynomial-based crypto algorithms can be implemented using much smaller numbers than in a finite-field setting of comparable cryptographic strength. Therefore, the use of elliptic polynomial cryptography is an improvement over finite-field based public-key cryptography.

In practice, an elliptic curve group over a finite field F is formed by choosing a pair of a and b coefficients, which are elements within F. The group consists of a finite set of points $P(x,y)$ which satisfy the elliptic curve equation $F(x,y)=y^2-x^3-ax-b=0$, together with a point at infinity, O. The coordinates of the point, x and y, are elements of F represented in N-bit strings. In the following, a point is either written as a capital letter (e.g., point P) or as a pair in terms of the affine coordinates; i.e. (x,y).

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k=Q$; where k is the discrete logarithm of Q to the base B. Using additive notation, the problem becomes: given two points B and Q in the group, find a number k such that $kB=Q$.

In an elliptic curve cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor which determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, $B=(2*(2*(2B)))+2B=Q$, it would take three point-doublings and two point-additions.

Addition of two points on an elliptic curve is calculated as follows: when a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows: when a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$; i.e., $(x_3,y_3)=(x_1,y_1)+(x_2,y_2)$:

TABLE 1

| Summary of Addition Rules: $(x_3, y_3) = (x_1, y_1) + (x_2, y_2)$ | |
| --- | --- |
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling <br> $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = O - (x_1, y_1)$ | $(x_3, y_3) = (x_1, y_1) + O = (x_1, y_1) = (x_1, -y_1)$ |

For elliptic curve encryption and decryption, given a message point $(x_m,y_m)$, a base point $(x_B,y_B)$, and a given key, k, the cipher point $(x_C,y_C)$ is obtained using the equation $(x_C,y_C)=(x_m,y_m)+k(x_B,y_B)$.

There are two basics steps in the computation of the above equations. The first step is to find the scalar multiplication of the base point with the key, $k(x_B, y_B)$. The resulting point is then added to the message point, $(x_m, y_m)$ to obtain the cipher point. At the receiver, the message point is recovered from the cipher point, which is usually transmitted, along with the shared key and the base point $(x_m, y_m) = (x_C, y_C) - k(x_B, y_B)$.

As noted above, the x-coordinate, $x_m$, is represented as an N-bit string. However, not all of the N-bits are used to carry information about the data of the secret message. Assuming that the number of bits of the x-coordinate, $x_m$, that do not carry data is L, then the extra bits L are used to ensure that message data, when embedded into the x-coordinate, will lead to an $x_m$ value which satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left\lceil \frac{K}{N-L} \right\rceil.$$

It is important to note that the y-coordinate, $y_m$, of the message point carries no data bits.

An attack method, referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known.

As one of the measures against power analysis attack on elliptic curve cryptosystems, a method using randomized projective coordinates is known. This is a measure against an attack method of observing whether a specific value appears or not in scalar multiplication calculations, and inferring a scalar value from the observed result. By multiplication with a random value, the appearance of such a specific value is prevented from being inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than that in Rivest-Shamir-Adleman (RSA) cryptosystems, basing their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers which have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point (X, Y, Z) in conventional projective (or homogeneous) coordinates satisfies the homogeneous Weierstrass equation: $\tilde{F}(X, Y, Z) = Y^2 Z - X^3 - aXZ^2 - bZ^3 = 0$, and, when $z \neq 0$, it corresponds to the affine point $$(x, y) = \left( \frac{X}{Z}, \frac{Y}{Z} \right).$$

Other projective representations lead to more efficient implementations of the group operation, such as, for example, the Jacobian representations, where the triplets (X, Y, Z) correspond to the affine coordinates $$(x, y) = \left( \frac{X}{Z^2}, \frac{Y}{Z^3} \right)$$

whenever $z \neq 0$. This is equivalent to using a Jacobian elliptic curve equation that is of the form $\tilde{F}(X, Y, Z) = Y^2 - X^3 - aXZ^4 - bZ^6 = 0$.

Another commonly used projection is the Chudnovsky-Jacobian coordinate projection. In general terms, the relationship between the affine coordinates and the projection coordinates can be written as $$(x, y) = \left( \frac{X}{Z^i}, \frac{Y}{Z^j} \right)$$

where the values of i and j depend on the choice of the projective coordinates. For example, for homogeneous coordinates, $i=1$ and $j=1$.

The use of projective coordinates circumvents the need for division in the computation of each point addition and point doubling during the calculation of scalar multiplication. Thus, finite field division can be avoided in the calculation of scalar multiplication, $$k \left( \frac{X_B}{Z_B^i}, \frac{Y_B}{Z_B^j} \right),$$

when using projective coordinates.

The last addition for the computation of the cipher point, $$\left(\frac{X_C}{Z_C^i}, \frac{Y_C}{Z_C^j}\right);$$

i.e., the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right),$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m=1$.

However, one division (or one inversion and one multiplication) must still be carried out in order to calculate $$x_C = \frac{X_C}{Z_C^i},$$

since only the affine x-coordinate of the cipher point, $x_C$, is sent by the sender.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

Password protocols are used in applications where there is a need for a server to authenticate a remote user. Password protocols are different from asymmetric cryptography because password protocols are used for authentication and not for private communication. Password protocols are also different from public key cryptography, as password protocols do not necessarily need an independent certification of the server public key.

Public key-based password protocols have been proposed in which a remote user is authenticated by a human-memorized password. The server stores a file containing the plain passwords of users, or an image of the password, under a one-way function, along with other information that could help the authentication of the remote user.

In the password protocol, the user's password, which is a memorized quantity, is the only secret available to client software. It is also assumed that the network between the client and server is vulnerable to both eavesdropping and deliberate tampering by an enemy. Additionally, no trusted third party, such as a key server or arbitrator, can be used; i.e., only the original two parties can engage in the authentication protocol. Such protocols have a rather wide range of practical applications because they do not require any features beyond the memorized password, thus making them much easier to use, and less expensive to deploy, than either biometric: or token-based methods. One application is the handling of remote, password-protected computer access. It should be noted that most Internet protocols currently in use employ plaintext passwords for authentication.

One such protocol is the Secure Remote Password (SRP) Protocol, which is presently being considered as a possible standard for remote user access based on the password protocol. This password protocol also results in a shared secret key. The SRP authentication process is described below, from beginning to end, with Table 2 illustrating the notation used in the SRP authentication. It should be noted that the values n and g are well-known values, agreed on beforehand:

TABLE 2

Notation used in SRP

| | |
|---|---|
| n | A large prime number. All computations are performed modulo n. |
| g | A primitive root modulo n (often called a generator) |
| s | A random string used as the user's salt |
| P | The user's password |
| x | A private key derived from the password and salt |
| v | The host's password verifier |
| u | Random scrambling parameter, publicly revealed |
| a, b | Ephemeral private keys, generated randomly and not publicly revealed |
| A, B | Corresponding public keys |
| H( ) | One-way hash function |
| m, n | The two quantities (strings) m and n concatenated |
| K | Session key |

As an example, to establish a password P with Steve, Carol picks a random salt s, and computes $x=H(s, P)$ and $v=g^x$. Steve then stores v and s as Carol's password verifier and salt. It should be noted that the computation of v is implicitly reduced modulo n. x is discarded because it is equivalent to the plaintext password P.

The AKE protocol also allows Steve to have a password z with a corresponding public key held by Carol; in SRP, z=0 so that it drops out of the equations. Since this private key is 0, the corresponding public key is 1. Consequently, instead of safeguarding its own password z, Steve needs only to keep Carol's verifier v secret to assure mutual authentication. This frees Carol from having to remember Steve's public key and simplifies the protocol.

To authenticate, Carol and Steve engage in the protocol given below with reference to Table 3 and the following steps: (1) Carol sends Steve her username, (e.g., "carol"); (2) Steve looks up Carol's password entry and fetches her password verifier v and her salt s—he then sends s to Carol—Carol computes her long-term private key x using s and her real password P; (3) Carol generates a random number a, 1<a<n, and computes her ephemeral public key $A=g^a$, and sends it to Steve; (4) Steve generates his own random number b, 1<b<n, and computes his ephemeral public key $B=v+g^b$, and then sends it back to Carol, along with the randomly generated parameter u; (5) Carol and Steve compute the common exponential value $S=g^{(ab+bux)}$ using the values available to each of them—If Carol's password P entered in step (2) matches the one she originally used to generate v, then both values of S will match; (6) both sides hash the exponential S into a cryptographically strong session key; (7) Carol sends Steve M[1] as evidence that she has the correct session key—Steve computes M[1] himself and verifies that it matches what Carol sent him; and (8) Steve sends Carol M[2] as evidence that he also has the correct session key—Carol also verifies M[2] herself, accepting only if it matches Steve's value.

TABLE 3

Steps in SRP

| | Carol | | Steve |
|---|---|---|---|
| 1. | | C --> | (lookup s, v) |
| 2. | x = H(s, P) | <-- s | |
| 3. | A = $g^a$ | A --> | |
| 4. | | <-- B, u | B = v + $g^b$ |
| 5. | S = $(B - g^x)^{(a+ux)}$ | | S = $(A \cdot v^u)^b$ |
| 6. | K = H(S) | | K = H(S) |
| 7. | M[1] = H(A, B, K) | M[1] --> | (verify M[1]) |
| 8. | (verify M[2]) | <-- M[2] | M[2] = H(A, M[1], K) |

Both sides will agree on the session key $S=g^{(ab+bux)}$ if all steps are executed correctly. SRP also adds the two flows at the end to verify session key agreement using a one-way hash function. Once the protocol run completes successfully, both parties may use S to encrypt subsequent session traffic.

Thus, a method of generating a password protocol using elliptic polynomial cryptography solving the aforementioned problems is desired.

SUMMARY OF THE INVENTION

The method of generating a password protocol using elliptic polynomial cryptography allows for the generation of password protocols based on the elliptic polynomial discrete logarithm problem. It is well known that an elliptic polynomial discrete logarithm problem is a computationally "difficult" or "hard" problem. The method includes the following steps: (a) defining a maximum block size that can be embedded into (nx+1) x-coordinates and ny y-coordinates, wherein n is an integer, and setting the maximum block size to be (nx+ny+1)N bits, wherein N is an integer; and (b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a password that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial.

The sending correspondent then performs the following steps: (c) converting the password (or its image) by a selected one-way function into an equivalent scalar value $k_U$; (d) computing a scalar multiplication of the scalar value $k_U$ with the base point $(x_{0,B}, x_{1,B}, \ldots, x_{nx,B}, y_{0,B}, y_{1,B}, \ldots, y_{ny,B})$ as $(x_{0,C}, x_{1,C}, \ldots, x_{nx,C}, y_{0,C}, y_{1,C}, \ldots, y_{ny,C}) = k_U(x_{0,B}, x_{1,B}, \ldots, x_{nx,B}, y_{0,B}, y_{1,B}, \ldots, y_{ny,B})$, wherein $(x_{0,C}, x_{1,C}, \ldots, x_{nx,C}, y_{0,C}, y_{1,C}, \ldots, y_{ny,C})$ is a cipher point; and (e) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver (together with any other information needed to help recover the cipher point without sacrificing security).

The receiving correspondent then performs the following steps: (f) converting the password (or its image) by the selected one-way function into an equivalent scalar value $k_{US}$; (g) computing a scalar multiplication of the scalar value $k_{US}$ with the base point $(x_{0,B}, x_{1,B}, \ldots, x_{nx,B}, y_{0,B}, y_{1,B}, \ldots, y_{ny,B})$ as $(x_{0,SC}, x_{1,SC}, \ldots, x_{nx,SC}, y_{0,SC}, y_{1,SC}, \ldots, y_{ny,SC}) = k_{US}(x_{0,B}, x_{1,B}, \ldots, x_{nx,B}, y_{0,B}, y_{1,B}, \ldots, y_{ny,B})$; and comparing $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$ and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$ then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$, then denying access.

These and other features of the present invention will become readily apparent upon further review of the following specification and drawings.

BRIEF DESCRIPTION OF THE DRAWINGS

The sole drawing FIGURE is a block diagram illustrating system components for implementing the method of generating a password protocol using elliptic polynomial cryptography according to the present invention.

DETAILED DESCRIPTION OF THE PREFERRED EMBODIMENTS

The method of generating a password protocol using elliptic polynomial cryptography provides password protocol generation methods based on the elliptic polynomial discrete logarithm problem. It is well known that an elliptic polynomial discrete logarithm problem is a computationally "difficult" or "hard" problem.

The password protocols to be described below use elliptic polynomials in their generation, where different elliptic polynomials are used for different blocks of the same plaintext. Particularly, the password protocols use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space, and, as will be described in detail below, the method makes use of elliptic polynomials where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomial equation. Given that nx additional x-coordinates are used, with nx being greater than or equal to one, a resulting elliptic point has (nx+1) x-coordinates, where all coordinates are elements of the finite field F. The number of points which satisfy an elliptic polynomial equation with nx additional x-coordinates defined over F and which can be used in the corresponding cryptosystem is increased by a factor of $(\#F)^{nx}$, where # denotes the size of a field.

Through the use of this particular method, security is increased through the usage of different elliptic polynomials for different message blocks during the generation of a password protocol. Further, each elliptic polynomial used for each message block is selected at random, preferably using an initial value and a random number generator.

Given the form of the elliptic polynomial equation described above, the elliptic polynomial and its twist are isomorphic with respect to one another. The method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial.

The difficulty of using conventional elliptic polynomial cryptography to develop password protocols typically lies in the iterative and non-deterministic method needed to embed a bit string into an elliptic polynomial point, which has the drawback of the number of iterations needed being different for different bit strings which are being embedded. As a consequence, different calculation times are required for different blocks of bit strings. Such a data-dependant generation time is not suitable for generating password protocols, which require data independent encryption time. Further, with regard to iterative and non-deterministic methods in conventional elliptic polynomial cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the elliptic polynomial password protocols to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

Further, projective coordinates are used at the sending and receiving entities in order to eliminate inversion or division during each point addition and doubling operation of the scalar multiplication. It should be noted that all of the elliptic polynomial cryptography-based password protocols disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ given by $(i+j+k)$. Further, in the following, the symbol $\in$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the polynomial is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represent the set of numbers from 0 to nx (i.e., $S_{nx} = \{0, \ldots, nx\}$), and letting $S_{ny}$ represents the set of numbers from 0 to ny (i.e., $S_{ny} = \{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \quad (1)$$

$$\sum_{k \in S_{ny}} a_{3k} y_k + \sum_{k,l \in S_{ny}, i \in S_{nx}} c_{1kli} y_k y_l x_i +$$

$$\sum_{k \in S_{ny}, l \in S_{nx}} c_{2kl} y_k x_l + \sum_{k \in S_{ny}, l, i \in S_{nx}} c_{3kli} y_k x_l x_i =$$

$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c,$$

where $a_{1l}, a_{2kl}, a_{3k}, c_{1lki}, c_{2kl}, c_{3kli}, b_{1l}, b_{2kl}, b_{3lk}, b_{4k}$ & $b_c \in F$.

Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 x_1 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1kli}, c_{2kl}, c_{3kli}, b_{1l}, b_{2lk}, b_{3kl}, b_{4k}$ & $b_c \in F$ for F, wherein a set of points $EC^{nx+ny+2}$ is defined as the (nx+ny+2)-tuple $(x_0, x_1, \ldots, x_{nx}, y_0, y_1, \ldots, y_{ny})$, where $x_i, y_k \in F$, $i \in S_{nx}$ and $k \in S_{ny}$. This set of points comprises solutions of F, although excluding the point $(0, 0, \ldots, 0)$ and the point at infinity, $(x_{0,I}, x_{1,I}, \ldots, x_{nx,I}, y_{0,I}, y_{1,I}, \ldots, y_{ny,I})$.

The rules for conventional elliptic polynomial point addition may be adopted to define an additive binary operation, "+", over $EC^{nx+ny+2}$, i.e., for all:

$$(x_{0,1}, x_{1,1}, \ldots, x_{nx,1}, y_{0,1}, y_{1,1}, \ldots, y_{ny,1}) \in EC^{nx+ny+2} \text{ and}$$

$$(x_{0,2}, x_{1,2}, \ldots, x_{nx,2}, y_{0,2}, y_{1,2}, \ldots, y_{ny,2}) \in EC^{nx+ny+2},$$

the sum:

$$(x_{0,3}, x_{1,3}, \ldots, x_{nx,3}, y_{0,3}, y_{1,3}, \ldots, y_{ny,3}) =$$
$$(x_{0,1}, x_{1,1}, \ldots, x_{nx,1}, y_{0,1}, y_{1,1}, \ldots, y_{ny,1}) +$$
$$(x_{0,2}, x_{1,2}, \ldots, x_{nx,2}, y_{0,2}, y_{1,2}, \ldots, y_{ny,2})$$

is also:

$$(x_{0,3}, x_{1,3}, \ldots, x_{nx,3}, y_{0,3}, y_{1,3}, \ldots, y_{ny,3}) \in EC^{nx+ny+2}.$$

As will be described in greater detail below, $(EC^{nx+ny+2}, +)$ forms a pseudo-group (p-group) over addition that satisfies the following axioms:

(i) There exists a set $(x_{0,I}, x_{1,I}, \ldots, x_{nx,I}, y_{0,I}, y_{1,I}, \ldots, y_{ny,I}) \in EC^{nx+ny+2}$ such that:

$$(x_0, x_1, \ldots, x_{nx}, y_0, y_1, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny})$$

for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that:

$$(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,I}, x_{1,I}, \ldots, x_{nx,I}, y_{0,I}, y_{1,I}, \ldots, y_{ny,I});$$

(iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_x, \ldots, x_{nx}, y_0, y_1, \ldots, y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1}, x_{1,1}, \ldots, x_{nx,1}, y_{0,1}, y_{1,1}, \ldots, y_{ny,1})$ and $(x_{0,2}, x_{1,2}, \ldots, x_{nx,2}, y_{0,2}, y_{1,2}, \ldots, y_{ny,2})$ is given by:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}).$$

If the point $(x''_{0,1}, x''_{1,1}, \ldots, x''_{nx,1}, y''_{0,1}, y''_{1,1}, \ldots, y''_{ny,1})$ is equivalent to the point $(x_{0,1}, x_{1,1}, \ldots, x_{nx,1}, y_{0,1}, y_{1,1}, \ldots, y_{ny,1})$ then the former can be substituted for $(x_{0,1}, x_{1,1}, \ldots, x_{nx,1}, y_{0,1}, y_{1,1}, \ldots, y_{ny,1})$ in the above equation in order to obtain:

$$(x_{0,3}, x_{1,3}, \ldots, x_{nx,3}, y_{0,3}, y_{1,3}, \ldots, y_{ny,3}) = (x''_{0,1}, x''_{1,1}, \ldots, x''_{nx,1}, y''_{0,1}, y''_{1,1}, \ldots, y''_{ny,1}) + (x_{0,2}, x_{1,2}, \ldots, x_{nx,2}, y_{0,2}, y_{1,2}, \ldots, y_{ny,2}).$$

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition operation of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, otherwise expressed as:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is calculated in the following manner: First, a straight line is drawn which passes through the two points to be added. The straight line intersects $E^{nx+ny+2}$ at a third point, which we denote $(x'_{0,3}, x'_{1,3}, \ldots, x'_{nx,3}, y'_{0,3}, y'_{1,3}, \ldots, y'_{ny,3}) \in EC^{nx+ny+2}$. The sum point is defined as $(x_{0,3}, x_{1,3}, \ldots, x_{nx,3}, y_{0,3}, y_{1,3}, \ldots, y_{ny,3}) = -(x'_{0,3}, x'_{1,3}, \ldots, x'_{nx,3}, y'_{0,3}, y'_{1,3}, \ldots, y'_{ny,3})$.

From the above definition of the addition rule, addition over $EC^{nx+ny+2}$ is commutative, that is:

$$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$$

for all $(x_{0,1}, x_{1,1}, \ldots, x_{nx,1}, y_{0,1}, y_{1,1}, \ldots, y_{ny,1}) \in EEX^{nx+ny+2}$ and for all $(x_{0,2}, x_{1,2}, \ldots, x_{nx,2}, y_{0,2}, y_{1,2}, \ldots, y_{ny,2}) \in EC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}$, $x_{j,1} \neq x_{j,2}$; and (B) for all $j \in S_{nx}$, $x_{j,1} = x_{j,2} = x_{j,o}$. Case B includes three sub-cases:

i. for all $k \in S_{ny} y_{k,1} = y_{k,2}$, that is:

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2}),$$

which corresponds to point doubling;

ii. for $k \in S_{ny}$ & $k \neq 0$, $y_{k,1} = y_{k,2}$, and where $y_{0,1}$ & $y_{0,2}$ are the roots of the following quadratic equation in $y_0$:

$$a_{10} y_0^2 + \sum_{k \in S_{ny}, k \neq 0} a_{1k} y_{k,1}^2 + y_0 \left\{ \sum_{k \in S_{ny}, k \neq 0} a_{2k0} y_{k,1} + \sum_{l \in S_{ny}, l \neq 0} a_{20l} y_{l,1} \right\} +$$

$$\sum_{k,l \in S_{ny}, l \neq k, l \& k \neq 0} a_{2kl} y_{k,1} y_{l,1} + a_{30} y_0 + \sum_{k \in S_{ny}, k \neq 0} a_{3k} y_{k,1} +$$

$$y_0^2 \sum_{i \in S_{nx}} c_{100i} x_{i,1} + y_0 \left\{ \sum_{k \in S_{ny}, i \in S_{nx}} c_{1k0i} y_{k,1} x_{i,1} + \sum_{l \in S_{ny}, i \in S_{nx}} c_{10li} y_{l,1} x_{i,1} \right\} +$$

$$\sum_{k,l \in S_{ny}, l \& k \neq 0, i \in S_{nx}} c_{1kli} y_{k,1} y_{l,1} x_{i,1} + y_0 \sum_{l \in S_{nx}} c_{20l} x_{l,1} +$$

$$\sum_{k \in S_{ny}, k \neq 0, l \in S_{nx}} c_{2kl} y_{k,1} x_{l,1} + y_0 \sum_{l,i \in S_{nx}} c_{30li} x_{l,1} x_{i,1} +$$

$$\sum_{k \in S_{ny}, k \neq 0, l, i \in S_{nx}} c_{3kli} y_{k,1} x_{l,1} x_{i,1} = \sum_{l \in S_{nx}} b_{1l} x_{l,1}^3 +$$

$$\sum_{l,k \in S_{nx}, l \neq k} b_{2lk} x_{l,1}^2 x_{k,1} + \sum_{l,k \in S_{nx}} b_{3lk} x_{l,1} x_{k,1} + \sum_{k \in S_{nx}} b_{4k} x_{k,1} + b_c,$$

which corresponds to point inverse; and iii. all other conditions except those in Cases B.i and B.ii. This case occurs only when ny is greater than or equal to one.

For Case A, for at least one $j \in S_{nx} x_{j,1} \neq x_{j,2}$, a straight line in $(nx+ny+2)$-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j, i \in S_{nx}$.

For this case, $y_k = m_{yk} x_j + c_{yk}$, where $$m_{yk} = \frac{y_{k,2} - y_{k,1}}{x_{j,2} - x_{j,1}}$$

and $c_{yk} = y_{k,1} - x_{j,1} m_{yk}$. Further, $x_i = m_{xi} x_j + c_{xi}$, where $$m_{xi} = \frac{x_{i,2} - x_{i,1}}{x_{j,2} - x_{j,1}}$$

and $c_{xi} = x_{i,1} - x_{j,1} m_{xi}$. Equation (1) can then be re-written as:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$

$$x_j \sum_{k,l \in S_{ny}} c_{1klj} y_k y_l + \sum_{k,l \in S_{ny}, i \in S_{nx}, i \neq j} c_{1kli} y_k y_l x_i + x_j \sum_{k \in S_{ny}} c_{2kj} y_k +$$

$$\sum_{k \in S_{ny}, l \in S_{nx}, l \neq j} c_{2kl} y_k x_l + x_j^2 \sum_{k \in S_{ny}} c_{3kjj} y_k + x_j \sum_{k \in S_{ny}, l \in S_{nx}, l \neq j} c_{3klj} y_k x_l +$$

$$x_j \sum_{k \in S_{ny}, i \in S_{nx}, i \neq j} c_{3kji} y_k x_i + \sum_{k \in S_{ny}, l, i \in S_{nx}, l \& i \neq j} c_{3kli} y_k x_l x_i =$$

$$b_{1j} x_j^3 + \sum_{l \in S_{nx}, l \neq j} b_{1l} x_l^3 + x_j^2 \sum_{k \in S_{nx}, k \neq j} b_{2jk} x_k + x_j \sum_{l \in S_{nx}, l \neq j} b_{2lj} x_l^2 +$$

-continued $$\sum_{l,k \in S_{nx}, l,k \neq j, l \neq k} b_{2lk} x_l^2 x_k + b_{3jj} x_j^2 + x_j \sum_{k \in S_{nx}, k \neq j} b_{3jk} x_k +$$

$$x_j \sum_{l \in S_{nx}, l \neq j} b_{3lj} x_l + \sum_{l,k \in S_{nx}, l \neq j} b_{3lk} x_l x_k + b_{4j} x_j + \sum_{k \in S_{nx}, k \neq j} b_{4k} x_k + b_c,$$

and substitution of the above into the rewritten equation (1) for $y_k$, $k \in S_{ny}$, and $x_i$, $i \in S_{nx}$ & $i \neq j$, results in:

$$\sum_{k \in S_{ny}} a_{1k} (m_{yk} x_j + c_{jk})^2 + \sum_{k,l \in S_{ny}, l \neq k} a_{2kl} (m_{jk} x_j + c_{yk})(m_{yl} x_j + c_{yl}) +$$

$$\sum_{k \in S_{ny}} a_{3k} (m_{yk} x_j + c_{yk}) + x_j \sum_{k,l \in S_{ny}} c_{1klj} (m_{yk} x_j + c_{yk})(m_{yl} x_j + c_{yl}) +$$

$$\sum_{k,l \in S_{ny}, i \in S_{nx}, i \neq j} c_{1kli} (m_{yk} x_j + c_{yk})(m_{yl} x_j + c_{yl})(m_{xi} x_j + c_{xi}) +$$

$$x_j \sum_{k \in S_{ny}} c_{2kj} (m_{yk} x_j + c_{yk}) + \sum_{k \in S_{ny}, l \in S_{nx}, l \neq j} c_{2kl} (m_{yk} x_j + c_{yk})(m_{xl} x_j + c_{xl}) +$$

$$x_j^2 \sum_{k \in S_{ny}} c_{3kjj} (m_{yk} x_j + c_{yk}) +$$

$$x_j \sum_{k \in S_{ny}, l \in S_{nx}, l \neq j} c_{3klj} (m_{yk} x_j + c_{yk})(m_{xl} x_j + c_{xl}) +$$

$$x_j \sum_{k \in S_{ny}, i \in S_{nx}, i \neq j} c_{3kji} (m_{yk} x_j + c_{yk})(m_{xi} x_j + c_{xi}) +$$

$$\sum_{k \in S_{ny}, l, i \in S_{nx}, l \& i \neq j} c_{3kli} (m_{yk} x_j + c_{yk})(m_{xl} x_j + c_{xl})(m_{xi} x_j + c_{xi}) =$$

$$b_{1j} x_j^3 + \sum_{l \in S_{nx}, l \neq j} b_{1l} (m_{xl} x_j + c_l)^3 + x_j^2 \sum_{k \in S_{nx}, k \neq j} b_{2jk} (m_{xk} x_j + c_{xk}) +$$

$$x_j \sum_{l \in S_{nx}, l \neq j} b_{2lj} (m_{xl} x_j + c_{xl})^2 +$$

$$\sum_{l,k \in S_{nx}, l \& k \neq j, l \neq k} b_{2lk} (m_{xl} x_j + c_{xl})^2 (m_{xk} x_j + c_{xk}) + b_{3jj} x_j^2 +$$

$$x_j \sum_{k \in S_{nx}, k \neq j} b_{3jk} (m_{xk} x_j + c_{xk}) + x_j \sum_{l,k \in S_{nx}, l \neq j} b_{3lj} (m_{xl} x_j + c_{xl}) +$$

$$\sum_{l,k \in S_{nx}, l \& k \neq j} b_{3lk} (m_{xl} x_j + c_{xl})(m_{xk} x_j + c_{xk}) +$$

$$b_{4j} x_j + \sum_{k \in S_{nx}, k \neq j} a_{6k} (m_{xk} x_j + c_{xk}) + b_c$$

Expanding the terms in the above equation leads to a cubic equation of the form $x_j$, $C_3 x_j^3 + C_2 x_j^2 + C_1 x_j = 0$, where $C_3, C_2, C_1$ & $C_0$ are obtained from the above equation.

Assuming $C_3 \neq 0$, the above cubic equation in $x_j$ has three roots $x_{j,1}, x_{j,2}$, & $x'_{j,3}$ and can be written as $(x_j - x_{j,1})(x_j - x_{j,2})(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x'_{j,3}) = 0$, one obtains a solution for $x'_{j,3}$;

$$x'_{j,3} = \frac{-C_2}{C_3} - x_{j,1} - x_{j,2}. \quad (2)$$

The values of $y'_{k,3}, k \in S_{ny}$, and $x'_{i,3}$, $i \in S_{nx}$ & $i \neq j$, may be similarly obtained from equations for $x_j = x'_{j,3}$.

For cases where $C_3 = 0$, $C_3 x_j^3 + C_2 x_j^2 + C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,0}$ is defined as $x_{j,0} = x_{j,1} = x_{j,2}$, $j \in S_{nx}$.

For Case B.i., all $k \in S_{ny}$, $y_{k,1} = y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$. Letting:

$$(x_{0,o}, x_{1,o}, \ldots, x_{nx,o}, y_{0,o}, y_{1,o}, \ldots, y_{ny,o}) = (x_{0,1},$$
$$x_{1,1}, \ldots, x_{nx,1}, y_{0,1}, y_{1,1}, \ldots, y_{ny,1}) =$$
$$(x_{0,2}, x_{1,2}, \ldots, x_{nx,2}, y_{0,2}, y_{1,2}, \ldots, y_{ny,2})$$

the sum is written as $$(x_{0,3}, x_{1,3}, \ldots, x_{nx,3}, y_{0,3}, y_{1,3}, \ldots, y_{ny,3}) =$$
$$(x_{0,o}, x_{1,o}, \ldots, x_{nx,o}, y_{0,o}, y_{1,o}, \ldots, y_{ny,o}) +$$
$$(x_{0,o}, x_{1,o}, \ldots, x_{nx,o}, y_{0,o}, y_{1,o}, \ldots, y_{ny,o}) \quad (3)$$

There are several ways of defining the addition in this case. Three possible rules are described below. Case B.i.1: Letting $S_{nx,Lx}$ denote a subset of $S_{nx}$ with Lx elements, i.e., $S_{nx,Lx} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensinal space with coordinates $y_n$ and $x_m$ with $n \in S_{ny,Ly}$ and $m \in S_{ny,Lx}$.

In this case, the gradients $m_{yn}$ and $m_{xm}$ of the straight line to be used in equation (2) are essentially the first derivatives of $y_n$ and $x_m$, $n \in S_{ny,Ly}$ and $m \in S_{nx,Lx}$, for F with respect to $x_j$, $j \in S_{nx,Lx}$, i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Lx})$, then a solution for $x'_{j,3}$ may be obtained.

The values of $y'_{n,3}$ for $n \in S_{ny}$ and $x'_{m,3}$ for $m \in S_{nx}$ & $m \neq j$, can further be obtained for $x_j = x'_{j,3}$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lv}$, and $y_n$-coordinates, $n \in S_{ny,Lv}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as:

$$(x_{0,3}, x_{1,3}, \ldots, x_{nx,3}, y_{0,3}, y_{1,3}, \ldots, y_{ny,3}) = (x_{0,o}, x_{1,0}, \ldots, x_{nx,o}, y_{0,o}, y_{1,o}, \ldots, y_{ny,o}) + (x_{0,oe}, x_{1,oe}, \ldots, x_{nx,oe}, y_{0,oe}, y_{1,oe}, \ldots, y_{ny,oe})$$

With regard to Case B.ii, for $k \in S_{ny}$ & $k \neq 0$, $y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points, such as the point $(x_{0,o}, x_{1,o}, \ldots, x_{nx,o}, y_{0,1}, y_{1,o}, \ldots, y_{ny,o}) \in EC^{nx+ny+2}$ and the point $(x_{0,o}, x_{1,o}, \ldots, x_{nx,o}, y_{0,2}, y_{1,o}, \ldots, y_{ny,o}) \in EC^{nx+ny+2}$, are in the hyper-plane with $x_i = x_{i,o}, i \in S_{nx}$ and $y_k = y_{k,o}, k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $x_{0,o}, x_{1,o}, \ldots, x_{nx,o}, y_{1,o}, \ldots,$ & $y_{ny,o}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,1}, x_{1,1}, \ldots, x_{nx,1}, y_{0,1}, y_{1,1}, \ldots, y_{ny,1}) \in EC^{nx+ny+2}$. This point at infinity is used to define both the inverse of a point in $EC^{nx+ny+2}$ and the identity point. According to the addition rule defined above, one can write:

$$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,1}, x_{1,1}, \ldots, x_{nx,1}, y_{0,1}, y_{1,1}, \ldots, y_{ny,1}) \quad (4),$$

since the third point of intersection of such lines is assumed to be at infinity, $(x_{0,1}, x_{1,1}, \ldots, x_{nx,1}, y_{0,1}, y_{1,1}, \ldots, y_{ny,1}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$$-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny}).$$

Thus, equation (4) can be written as:

$$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,1}, x_{1,1}, \ldots, x_{nx,1}, y_{0,1}, y_{1,1}, \ldots, y_{ny,1}) \quad (5).$$

Further, a line joining the point at infinity $(x_{0,1}, x_{1,1}, \ldots, x_{nx,1}, y_{0,1}, y_{1,1}, \ldots, y_{ny,1}) \in EC^{nx+ny+2}$ and a point $(x_0, x_1, \ldots, x_{nx}, y_0, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, y_2, \ldots, y_{ny}) + (x_{0,1}, x_{1,1}, \ldots, x_{nx,1}, y_{0,1}, y_{1,1}, \ldots, y_{ny,1}) = (x_0, x_1, \ldots, x_{nx}, y_0, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$.

There are several possible rules to find the sum point in this case. Three possible methods are given below:

1) Using three point doublings and one point addition, $$(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2});$$

2) using one point doublings and three point additions, $$(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1}); \text{ and}$$

3) using point equivalence, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e}),$$

where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(\in EC^{nx+ny+2}, +)$ is as follows: Given particular elliptic polynomial equations (i.e., for particular coefficients $a_{1l}, a_{2kl}, a_{3k}, c_{1lki}, c_{2kl}, c_{3kli}, b_{1l}, b_{2lk}, b_{3lk}, b_{4k}, b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points $Q, R, S \in EC^{nx+ny+2}$ (or any of their equivalent points) can be written as $k_Q P, k_R P, k_S P \in EC^{nx+ny+2}$, respectively, thus their sum $(Q+R+S) = (k_Q P + k_R P + k_S P) = (k_Q + k_R + k_S)P$ can be carried out in any order.

The following elliptic polynomial equation with nx=1 and ny=0 is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $x_1$, one obtains $(m_{y0} x_0 + c_{y0})^2 = x_0^3 + (m_{x1} x_0 + c_{x1})^3 + x_0(m_{x1} x_0 + c_{x1})$.

Expanding this equation yields the equation $m_{y0}^2 x_0^2 + 2m_{y0} c_{y0} x_0 + c_{y0}^2 = x_0^3 + m_{x1}^3 x_0^3 + 3m_{x1}^2 c_{x1} x_0^2 + 3m_{x1} c_{x1}^2 x_0 + c_{x1}^3 + m_{x1} x_0^2 + c_{x1} x_0$, or $(1 + m_{x1}^3) x_0^3 + (3m_{x1}^2 c_{x1} + m_{x1} - m_{y0}^2) x_0^2 + (3m_{x1} c_{x1}^2 + c_{x1} - 2m_{y0} c_{y0}) x_0 + c_{x1}^3 - c_{y0}^2 = 0$. From equation (2), the solution for $x'_{0,3}$ in this case is obtained:

$$x'_{0,3} = \frac{-(3m_{x1}^2 c_{x1} + m_{x1} - m_{y0}^2)}{(1 + m_{x1}^3)} - x_{j,1} - x_{j,2}.$$

Similarly, one can obtain the values of $y'_{0,3}$ and $x'_{1,3}$ for $x_0 = x'_{0,3}$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \text{ for } i \in S_{nx}; \text{ and}; \quad (7)$$

and $$y_k = \frac{Y_k}{V^3} \text{ for } k \in S_{ny}. \quad (8)$$

Using Jacobian projection yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \quad (9)$$

$$\sum_{k,l \in S_{ny}, i \in S_{nx}} c_{1kli} \frac{Y_k}{V^3} \frac{Y_l}{V^3} \frac{X_i}{V^2} + \sum_{k \in S_{ny}, l \in S_{nx}} c_{2kl} \frac{Y_k}{V^3} \frac{X_l}{V^2} +$$

$$\sum_{k \in S_{ny}, l,i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{l,k \in S_{nx}, l \neq k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \quad (10)$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k \in S_{ny}, l \in S_{nx}} c_{2kl} Y_k X_l V^3 + \sum_{k \in S_{ny}, l,i \in S_{nx}} c_{3kli} Y_k X_l X_i V =$$

$$\sum_{l \in S_{nx}} b_{1l} X_l^3 V^2 + \sum_{l,k \in S_{nx}, l \neq k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) =$$
$$\left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right).$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \quad (11)$$

$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$

$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using Jacobian projective coordinates in the equations of Cases A and B above, and by an appropriate choice of the value of $V_3$, it can be shown that point doubling and point addition can be computed without the need for field inversion or division.

In order to examine the embedding method, the twist of an elliptic polynomial equation needs to be defined. Given an elliptic polynomial with (nx+1) x-coordinates and (ny+1) y-coordinates of the form described above:

$$y_0^2 + \sum_{k \in S_{ny}} a_{1k} y_k^2 + \sum_{k,l \in S_{ny}, l \neq k} a_{2kl} y_k y_l = \sum_{l \in S_{nx}} b_{1l} x_l^3 + \sum_{l,k \in S_{nx}, l \neq k} b_{2lk} x_l^2 x_k, \quad (12)$$

where $a_{1l}, a_{2kl}, b_{1l}, b_{2lk} \in F$.

Given certain values for the x-coordinates $x_{0,o}, x_{1,o}, \ldots, x_{nx,o}$ and y-coordinates $y_{1,o}, \ldots, y_{ny,o}$, respectively, that are elements of the finite field, F, these values are substituted into the elliptic polynomial equation (1) in order to obtain a quadratic equation in $y_0$:

$$y_0^2 = -\sum_{k \in S_{ny}} a_{1k} y_{k,o}^2 - \sum_{k,l \in S_{ny}, l \neq k} a_{2kl} y_{k,o} y_{l,o} +$$

$$\sum_{l \in S_{nx}} b_{1l} x_{l,o}^3 + \sum_{l,k \in S_{nx}, l \neq k} b_{2lk} x_{l,o}^2 x_{k,o} = T.$$

If a solution of the above quadratic equation (i.e., $y_0^2 = T$) is an element of the finite field F, the point $(x_{0,o}, x_{1,o}, \ldots, x_{nx,o}, y_0, y_{1,o}, \ldots, y_{ny,o})$ is said to satisfy the given elliptic polynomial equation. If a solution of the above quadratic equation is not an element of the finite field F, the point $(x_{0,o}, x_{1,o}, \ldots, x_{nx,o}, y_0, y_{1,o}, \ldots, y_{ny,o})$ is said to satisfy the twist of the given elliptic curve equation. The inventive embedding method is based on the isomorphic relationship between a curve and its twist as described in the following theorem:

An elliptic polynomial equation of the form given above is isomorphic to its twist if:

1) there are mathematical mappings that can be defined on the values of $x_0, x_1, \ldots, x_{nx}, y_1, \ldots, y_{ny}$ (i.e., $\phi_x(x_i)$ and $\phi_y(y_i)$) such that any point $(x_0, x_1, \ldots, x_{nx}, y_0, y_1, \ldots, y_{ny})$ that satisfies such an elliptic polynomial equation can be mapped into another point $(\phi_x(x_0), \phi_x(x_1), \ldots, \phi_x(x_{xn}), \phi_y(y_0), \phi_y(y_1), \ldots, \phi_y(y_{ny}))$ that satisfies the twist of the same elliptic polynomial equation; and 2) the mapping between the points $(x_0, x_1, \ldots, x_{nx}, y_0, y_1, \ldots, y_{ny})$ and $(\phi_x(x_0), \phi_x(x_1), \ldots, \phi_x(x_{xn}), \phi_y(y_0), \phi_y(y_1), \ldots, \phi_y(y_{ny}))$ is unique, i.e., a one-to-one correspondence.

The proof of this theorem is as follows. Re-writing equation (12) as:

$$y_0^2 = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k, \quad (13)$$

and letting the right-hand side of equation (13) be denoted as T, then:

$$T = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k. \quad (14)$$

Thus, any value of $x_0, x_1, \ldots, x_{nx}, y_1, \ldots, y_{ny}$ will lead to a value of $T \in F(p)$. T could be quadratic residue or non-quadratic residue. If T is quadratic residue, then equation (14) is written as:

$$T_q = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q} \quad (15)$$

where $x_{0,q}, x_{1,q}, \ldots, x_{nx,q}, y_{1,q}, \ldots, y_{ny,q} \in F$ denotes the values of $x_0, x_1, \ldots, x_{nx}, y_1, \ldots, y_{ny}$ that result in a quadratic residue value of T, which is hereafter denoted as $T_q$.

If T is non-quadratic residue, then equation (14) is written as:

$$T_{\bar{q}} = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}} \quad (16)$$

where $x_{0,\bar{q}}, x_{1,\bar{q}}, \ldots, x_{nx,\bar{q}}, y_{1,\bar{q}}, \ldots, y_{ny,\bar{q}} \in F$ denotes the values of $x_0, x_1, \ldots, x_{nx}, y_1, \ldots, y_{ny}$ that result in a non-quadratic residue value of T, denoted as $T_{\bar{q}}$.

Letting g be any non-quadratic residue number in F (i.e., $g \in F(p)$ & $\sqrt{g} \notin F(p)$), then multiplying equation (15) with $g^3$ yields:

$$g^3 T_q = -g^3 \sum_{k \in S_{ny}} a_{1k} y_{k,q}^2 - g^3 \sum_{k,l \in S_{ny}, l \neq k} a_{2kl} y_{k,q} y_{l,q} + g^3 \sum_{l \in S_{nx}} b_{1l} x_{l,q}^3 + g^3 \sum_{l,k \in S_{nx}, l \neq k} b_{2lk} x_{l,q}^2 x_{k,q},$$

which can be re-written as:

$$g^3 T_q = -\sum_{k \in S_{ny}} a_{1k} (\sqrt{g^3} \, y_{k,q})^2 - \sum_{k,l \in S_{ny}, l \neq k} a_{2kl} g^3 (\sqrt{g^3} \, y_{k,q})(\sqrt{g^3} \, y_{l,q}) + \sum_{l \in S_{nx}} b_{1l} (g x_{l,q})^3 + \sum_{l,k \in S_{nx}, l \neq k} b_{2lk} (g x_{l,q})^2 (g x_{k,q}). \quad (17)$$

It should be noted that if g is non-quadratic residue, then $g^3$ is also non-quadratic residue. Further, the result of multiplying a quadratic residue number by a non-quadratic residue number is a non-quadratic residue number. Thus, $g^3 T_q$ is non-quadratic residue.

By comparing the terms of equations (16) and (17), we obtain the following mappings:

$$x_{i,\bar{q}} = g x_{i,q} \quad (18);$$

$$y_{i,\bar{q}} = \sqrt{g^3} \, y_{i,q}; \quad (19); \text{ and}$$

$$T_{\bar{q}} = g^3 T_q \quad (20).$$

The mappings between the variables $x_{i,q}$ and $x_{i,\bar{q}}$ in equation (18), $y_{i,q}$ and $y_{i,\bar{q}}$ in equation (19), and $T_q$ and $T_{\bar{q}}$ in equation (20) are all bijective, i.e., there is a one-to-one correspondence from basic finite field arithmetic. As a consequence, the mappings between the (nx+ny+2)-tuple $(x_{0,q}, x_{1,q}, \ldots, x_{nx,q}, T_q, y_{1,q}, \ldots, y_{ny,q})$ and the (nx+ny+2)-tuple $(x_{0,\bar{q}}, x_{1,\bar{q}}, \ldots, x_{nx,\bar{q}}, T_{\bar{q}}, y_{1,\bar{q}}, \ldots, y_{ny,\bar{q}})$ are also bijective.

Therefore, for every solution of equation (15), there is an isomorphic solution that satisfies equation (16), and since the mappings of the coordinates of one to the other are given in equations (18)-(20), these two solutions are isomorphic with respect to each other.

Since $T_q$ is quadratic residue, this expression can be written as:

$$T_q = y_0^2. \quad (21)$$

Thus, from equation (20), $T_{\bar{q}}$ can be written as:

$$T_{\bar{q}} = g^3 y_0^2 \quad (22).$$

Using equations (21) and (22), equations (15) and (16) can be written as:

$$y_0^2 = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q}; \quad (23)$$

and $$g^3 y_0^2 = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}. \quad (24)$$

Since any solution of equation (15) has an isomorphic solution that satisfies equation (16), it follows that the solution of equation (23), denoted as $(x_{0,q}, x_{1,q}, \ldots, x_{nx,q}, y_0, y_{1,q}, \ldots, y_{ny,q})$, has an isomorphic solution that satisfies equation (24), denoted as $$\left(g x_{0,q}, g x_{1,q}, \ldots, g x_{nx,q}, g^{\frac{3}{2}} y_0, g^{\frac{3}{2}} y_{1,q}, \ldots, g^{\frac{3}{2}} y_{ny,q}\right).$$

The solutions of equation (23) form the points $(x_{0,q}, x_{1,q}, \ldots, x_{nx,q}, y_0, y_{1,q}, \ldots, y_{ny,q})$ that satisfy an elliptic polynomial. Similarly, the solutions of equation (24) form the points $$\left(g x_{0,q}, g x_{1,q}, \ldots, g x_{nx,q}, g^{\frac{3}{2}} y_0, g^{\frac{3}{2}} y_{1,q}, \ldots, g^{\frac{3}{2}} y_{ny,q}\right)$$

that satisfy its twist. This proves the above theorem.

An example of a mapping of the solutions of equation (23) defined over F(p), where p≡3 mod 4, to the solutions of its twist is implemented by using $-x_i$ for the x-coordinates and $-y_i^2$ for the y-coordinates.

The isomorphism between an elliptic polynomial and its twist, discussed above, is exploited for the embedding of the bit sting of a shared secret key into the appropriate x and y coordinates of an elliptic polynomial point without the need for an iterative search for a quadratic residue value of the corresponding $y_0$-coordinate, which usually requires several iterations, where the number of iterations needed is different for different bit strings which are being embedded.

Assuming F=F(p) and that the secret key is an M-bit string such that (nx+ny+1)N>M>N−1, where N is the number of bits needed to represent the elements of F(p), then the secret key bit string is divided into (nx+ny+1) bit-strings $k_{x,0}, k_{x,1}, \ldots, k_{x,nx}, k_{y,1}, \ldots, k_{k,ny}$. The value of the bit-strings $k_{x,0}, k_{x,1}, \ldots, k_{x,nx}, k_{y,1}, \ldots, k_{k,ny}$ must be less than p. In the preferred embodiment of embedding the (nx+ny+1) bit-strings $k_{x,0}, k_{x,1}, \ldots, k_{x,nx}, k_{y,1}, \ldots, k_{k,ny}$, the embedding is as follows.

First, assign the value of the bit string of $k_{x,0}, k_{x,1}, \ldots, k_{x,nx}$ to $x_{0,k}, x_{1,k}, \ldots, x_{nx,k}$. Next, assign the value of the bit string of $k_{y,1}, \ldots, k_{k,ny}$ to $y_{1,k}, \ldots, k_{ny,k}$. Then, compute:

$$T = -\sum_{i \in S_{ny}} a_{1i} y_{i,k}^2 - \sum_{i,l \in S_{ny}, l \neq i} a_{2il} y_{i,k} y_{l,k} + \sum_{l \in S_{nx}} b_{1l} x_{l,k}^3 + \sum_{l,i \in S_{nx}, l \neq i} b_{2li} x_{l,k}^2 x_{i,k}.$$

Finally, use the Legendre test to see if T has a square root. If T has a square root, assign one of the roots to $y_0$; otherwise, the x-coordinates and y-coordinates of the elliptic polynomial point with the embedded shared secret key bit string are given by $gx_{i,k}$ and $$g^{\frac{3}{2}} y_{i,k},$$

respectively, where g is non-quadratic residue in F.

It should be noted that p is usually predetermined prior to encryption, so that the value of g can also be predetermined. Further, the receiver can identify whether the point $(x_{0,k}, x_{1,k}, \ldots, k_{ny,k}, y_{0,k}, y_{1,k}, \ldots, y_{ny,k})$ or the point $$\left(gx_{0,k}, gx_{1,k}, \ldots, gx_{nx,k}, g^{\frac{3}{2}} y_{0,k}, g^{\frac{3}{2}} y_{1,k}, \ldots, g^{\frac{3}{2}} y_{ny,k}\right)$$

is the elliptic polynomial point with the embedded secret key bit strings without any additional information. Additionally, any non-quadratic value in F(p) can be used for g. For efficiency, g is chosen to be −1 for p≡3 mod 4 and g is chosen to be 2 for p≡1 mod 4.

The same deterministic and non-iterative method described above can be used to embed a secret message bit string into an elliptic polynomial point in a deterministic and non-iterative manner. Assuming F=F(p) and that the message is an M-bit string such that (nx+ny+1)N>M>N−1, where N is the number of bits needed to represent the elements of F(p), then the message bit string is divided into (nx+ny+1) bit-strings $m_{x,0}, m_{x,1}, \ldots, m_{x,nx}, m_{y,1}, \ldots, m_{k,ny}$. The value of the bit-strings $m_{x,0}, m_{x,1}, \ldots, m_{x,nx}, m_{y,1}, \ldots, m_{k,ny}$ must be less than p. As in the previous embodiment, the embedding of the (nx+ny+1) bit-strings $m_{x,0}, m_{x,1}, \ldots, m_{x,nx}, m_{y,1}, \ldots, m_{k,ny}$ can be accomplished out as follows.

First, assign the value of the bit string of $m_{x,0}, m_{x,1}, \ldots, m_{x,nx}$ to $x_{0,m}, x_{1,m}, \ldots, x_{nx,m}$. Next, assign the value of the bit string of $m_{y,1}, \ldots, m_{k,ny}$ to $y_{1,m}, \ldots, y_{ny,m}$. Then compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, then assign one of the roots to $y_0$, otherwise the x-coordinates and y-coordinates of the elliptic polynomial point with the embedded shared secret key bit string are given by $gx_{i,m}$ and $$g^{\frac{3}{2}} y_{i,m},$$

respectively.

It should be noted that p is usually predetermined prior to encryption; thus, the value of g can also be predetermined. Further, when using the above method, the strings in $m_{x,0}, m_{x,1}, \ldots, m_{x,nx}$ and $m_{y,1}, \ldots, m_{k,ny}$ can be recovered directly from $x_{0,m}, x_{1,m}, \ldots, x_{nx,m}$ and $y_{1,m}, \ldots, y_{ny,m}$, respectively. An extra bit is needed to identify whether $(x_{0,m}, x_{1,m}, \ldots, x_{nx,m}, y_{0,m}, y_{1,m}, \ldots, y_{ny,m})$ or $$\left(gx_{0,m}, gx_{1,m}, \ldots, gx_{nx,m}, g^{\frac{3}{2}} y_{0,m}, g^{\frac{3}{2}} y_{1,m}, \ldots, g^{\frac{3}{2}} y_{ny,m}\right)$$

is used at the sending correspondent. Additionally, any non-quadratic value in F(p) can be used for g. For efficiency, g is chosen to be −1 for p≡3 mod 4 and is chosen to be 2 for p≡1 mod 4. Further, at the receiver, the process is reversed. In the case of g=2, a division by two is carried out. It should noted that dividing $x_{i,m}$ by two is computed using one modulo addition, because:

(i) $x_{i,m}/2 = ((x_{i,m} - (x_{i,m}) \mod 2)/2) + (x_{i,m}) \mod 2 * (1/2) \mod p$;
(ii) $(x_{i,m}) \mod 2$ is the least significant bit of $x_{i,m}$; and
(iii) $(1/2) \mod p = (p+1)/2$.

In a first embodiment, the password protocol generation method includes the following steps: (a) defining a maximum block size that can be embedded into (nx+1) x-coordinates and ny y-coordinates, wherein nx and ny are integers, and setting the maximum block size to be (nx+ny+1)N bits, wherein N is an integer; (b) a sending correspondent and a receiving correspondent agree upon an elliptic polynomial $EC^{nx+ny+2}$ by agreeing upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, the sending and receiving correspondents further agreeing upon a method that converts a password into a bit string that has an equivalent scalar value, wherein the above shared information may be kept private or made public, and the sending and receiving correspondents then further agree on the password, which represents a shared secret key for communication.

The sending correspondent then performs the following steps: (c) converting the password into a bit string by the agreed method and defining an equivalent scalar value $k_U$; (d) computing a scalar multiplication of the scalar value $k_U$ with the base point $(x_{0,B}, x_{1,B}, \ldots, x_{nx,B}, y_{0,B}, y_{1,B}, \ldots, y_{ny,B})$ as $(x_{0,C}, x_{1,C}, \ldots, x_{nx,C}, y_{0,C}, y_{1,C}, \ldots, y_{ny,C}) = k_U(x_{0,B}, x_{1,B}, \ldots, x_{nx,B}, y_{0,B}, y_{1,B}, \ldots, y_{ny,B})$, wherein $(x_{0,C}, x_{1,C}, \ldots, x_{nx,C}, y_{0,C}, y_{1,C}, \ldots, y_{ny,C})$ is a cipher point; (e) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver (together with any other information needed to help recover the cipher point without sacrificing security).

The receiving correspondent then performs the following steps: (f) converting the password into a bit string by the agreed upon method and defining an equivalent scalar value $k_{US}$; (g) computing a scalar multiplication of the scalar value $k_{US}$ with the base point $(x_{0,B}, x_{1,B}, \ldots, x_{nx,B}, y_{0,B}, y_{1,B}, \ldots, y_{ny,B})$ as $(x_{0,SC}, x_{1,SC}, \ldots, x_{nx,SC}, y_{0,SC}, y_{1,SC}, \ldots, y_{ny,SC}) = k_{US}(x_{0,B}, x_{1,B}, \ldots, x_{nx,B}, y_{0,B}, y_{1,B}, \ldots, y_{ny,B})$; and (h) comparing $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$ and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$ then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$, then denying access.

In an alternative embodiment, the password protocol generation method includes the following steps: (a) defining a maximum block size that can be embedded into (nx+1) x-coordinates and ny y-coordinates, wherein nx and ny are integers, and setting the maximum block size to be (nx+ny+1)N bits, wherein N is an integer; (b) a sending correspondent and a receiving correspondent agree upon an elliptic polynomial $EC^{nx+ny+2}$ by agreeing upon the values of nx and ny, and further agree on a set of coefficients $a_{1k}, a_{2kl}, a_{3k}, c_{1kl}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$, wherein $EC^{nx+ny+2}$ represents the elliptic polynomial, the sending and receiving correspondents further agreeing upon a method that converts a password into a bit string that has an equivalent scalar value, wherein the above shared information may be kept private or made public, and the sending and receiving correspondents then further agree on the password, which represents a shared secret key for communication.

The sending correspondent then performs the following steps: (c) converting the password into a secret bit string $k_p$ by the agreed upon method; (d) dividing the secret bit string $k_p$ into (nx+ny+2) binary sub-strings, $k_{x,0}, k_{x,1}, \ldots, k_{x,nx}, k_{y,0}, k_{y,1}, \ldots, k_{y,ny}$; (e) embedding the secret sub-string $k_{x,0}, k_{x,1}, \ldots, k_{x,nx}, k_{y,1}, \ldots, k_{y,ny}$ into the (nx+1) x-coordinates and the ny y-coordinates, wherein the resultant point satisfies the elliptic polynomial to obtain a password embedded point $(x_{0,P}, x_{1,P}, \ldots, x_{nx,P}, y_{0,P}, y_{1,P}, \ldots, y_{ny,P})$, the password embedded point being an elliptic point; (f) computing a scalar multiplication of a scalar value $k_{y,0}$ with the password embedded point $(x_{0,P}, x_{1,P}, \ldots, x_{nx,P}, y_{0,P}, y_{1,P}, \ldots, y_{ny,P})$ as $(x_{0,C}, x_{1,C}, \ldots, x_{nx,C}, y_{0,C}, y_{1,C}, \ldots, y_{ny,C}) = (x_{0,P}, x_{1,P}, \ldots, x_{nx,P}, y_{0,P}, y_{1,P}, \ldots, y_{ny,P})$, wherein $(x_{0,C}, x_{1,C}, \ldots, x_{nx,C}, y_{0,C}, y_{1,C}, \ldots, y_{ny,C})$ is a cipher point; and (g) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver (together with any other information needed to help recover the cipher point without sacrificing security).

The receiving correspondent then performs the following steps: (h) converting the password into a secret bit string $k_{Sp}$ by the agreed upon method; (i) dividing the secret bit string $k_{Sp}$ into (nx+ny+2) binary sub-strings, $k_{Sx,0}, k_{Sx,1}, \ldots, k_{Sx,nx}, k_{Sy,0}, k_{Sy,1}, \ldots, k_{Sy,ny}$; (j) embedding the secret sub-string $k_{Sx,0}, k_{Sx,1}, \ldots, k_{Sx,nx}, k_{Sy,0}, k_{Sy,1}, \ldots, k_{Sy,ny}$ into the (nx+1) x-coordinates and the ny y-coordinates, wherein the resultant point satisfies the elliptic polynomial to obtain a password embedded point $(x_{0,SP}, x_{1,SP}, \ldots, x_{nx,SP}, y_{0,SP}, y_{1,SP}, \ldots, y_{ny,SP})$ the password embedded point being an elliptic polynomial point; (k) computing a scalar multiplication of a scalar value $k_{Sy,0}$ with the password embedded point $(x_{0,SP}, x_{1,SP}, \ldots, x_{nx,SP}, y_{0,SP}, y_{1,SP}, \ldots, y_{ny,SP})$ as $(x_{0,SC}, x_{1,SC}, \ldots, x_{nx,SC}, y_{0,SC}, y_{1,SC}, \ldots, y_{ny,SC}) = k_{Sy,0}(x_{0,SP}, x_{1,SP}, \ldots, x_{nx,SP}, y_{0,SP}, y_{1,SP}, \ldots, y_{ny,SP})$ and (l) comparing $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$, and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$, then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$, then denying access.

In another alternative embodiment, the method includes the following steps: (a) defining a maximum block size that can be embedded into (nx+1) x-coordinates and ny y-coordinates, wherein nx and ny are integers, and setting the maximum block size to be (nx+ny+1)N bits, wherein N is an integer; (b) a sending correspondent and a receiving correspondent agree upon an elliptic polynomial $EC^{nx+ny+2}$ by agreeing upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a base point on an elliptic polynomial $(x_{0,B}, x_{1,B}, \ldots, x_{nx,B}, y_{0,B}, y_{1,B}, \ldots, y_{y,B}) \in EC^{xn+ny+2}$, wherein $EC^{nx+ny+2}$ represents the elliptic polynomial, the sending and receiving correspondents further agreeing upon a method that converts a password into a bit string that has an equivalent scalar value, wherein the above shared information may be kept private or made public, and the sending and receiving correspondents then further agree on the password, which represents a shared secret key for communication.

The sending correspondent then performs the following steps: (c) converting the password into a secret bit string $k_U$; (d) dividing the secret bit string $k_U$ into (nx+ny+3) binary sub-strings, $k_{Ux,0}, k_{Ux,1}, \ldots, k_{Ux,nx}, k_{Uy,1}, \ldots, k_{Uy,ny}$ and $k_{U1}, k_{U2}$; (e) embedding the secret sub-string $k_{Ux,0}, k_{Ux,1}, \ldots, k_{Ux,nx}, k_{Uy,1}, \ldots, k_{Uy,ny}$ into the (nx+1) x-coordinates and the ny y-coordinates, wherein the resultant point satisfies the elliptic polynomial to obtain a password embedded point $(x_{0,U}, x_{1,U}, \ldots, x_{nx,U}, y_{0,U}, \ldots, y_{ny,U})$, the password embedded point being an elliptic polynomial point; (f) computing a scalar multiplication of a scalar value $k_{U1}$ with the base point, $(x_{0,B}, x_{1,B}, \ldots, x_{nx,B}, y_{0,B}, y_{1,B}, \ldots, y_{ny,B})$ and the scalar value, $k_{U2}$, with the user point, $(x_{0,U}, x_{1,U}, \ldots, x_{nx,U}, y_{0,U}, y_{1,U}, \ldots, y_{ny,U})$, as $(x_{0,C}, x_{1,C} \ldots, x_{nx,C}, y_{0,C}, y_{1,C}, \ldots, y_{ny,C}) =$
$\quad k_{U1}(x_{0,B}, x_{1,B}, \ldots, x_{nx,B}, y_{0,B}, y_{1,B}, \ldots, y_{ny,B}) + k_{U2}$
$\quad (x_{0,U}, x_{1,U}, \ldots, x_{nx,U}, y_{0,U}, y_{1,U}, \ldots, y_{ny,U})$ wherein $(x_{0,C}, x_{1,C}, \ldots, x_{nx,C}, y_{0,C}, y_{1,C}, \ldots, y_{ny,C})$ is a cipher point; and (g) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver.

The receiving correspondent then performs the following steps: (h) converting the password into a bit string $k_{US}$ using the agreed upon method; (i) dividing the secret key string $k_{Sp}$ into (nx+ny+3) binary sub-strings $k_{USx,0}, k_{USx,1}, \ldots, k_{USx,nx}, k_{USy,1}, \ldots, k_{USy,ny}$ and $k_{US1}, k_{US2}$; (j) embedding the secret sub-string $k_{USx,0}, k_{USx,1}, \ldots, k_{USx,nx}, k_{USy,1}, \ldots, k_{USy,ny}$ into the (nx+1) x-coordinates and the ny y-coordinates, wherein the resultant point satisfies the elliptic polynomial to obtain a password embedded point $(x_{0,US}, x_{1,US}, \ldots, x_{nx,US}, y_{0,US}, y_{1,US}, \ldots, y_{ny,US})$, the password embedded point being an elliptic polynomial point; (k) computing a scalar multiplication of the scalar value $k_{US1}$ with the base point $(x_{0,B}, x_{1,B}, \ldots, x_{nx,B}, y_{0,B}, y_{1,B}, \ldots, y_{ny,B})$, and computing a scalar multiplication of the scalar value $k_{US2}$ with the user point $(x_{0,US}, x_{1,US}, \ldots, x_{nx,US}, y_{0,US}, y_{1,US}, \ldots, y_{ny,US})$ to compute the point $(x_{0,SC}, x_{1,SC}, \ldots, x_{nx,SC}, y_{0,SC}, y_{1,SC}, \ldots, y_{ny,SC})$ as $$(x_{0,SC}, x_{1,SC}, \ldots, x_{nx,SC}, y_{0,SC}, y_{1,SC}, \ldots, y_{ny,SC}) = k_{U1}(x_{0,B}, x_{1,B}, \ldots, x_{nx,B}, y_{0,B}, y_{1,B}, \ldots, y_{ny,Bu}) +;$$

and $$k_{U2}(x_{0,US}, x_{1,US}, \ldots, x_{nx,US}, y_{0,US}, y_{1,US}, \ldots, y_{ny,US})$$

(l) comparing $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$ and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$ then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$ then denying access.

As noted above, the methods include data embedding. In order to embed a bit string onto an elliptic polynomial point, the following steps are performed:

(a) dividing a bit string into (nx+ny+1) bit strings $k_{x,0}, k_{x,1}, \ldots, k_{x,nx}, k_{y,1}, \ldots, k_{y,ny}$;

(b) assigning the value of the bit strings of $k_{x,0}, k_{x,1}, \ldots, k_{x,nx}$ as $x_{0,k}, x_{1,k}, \ldots, x_{nx,k}$;

(c) assigning the value of the bit strings of $k_{y,1}, \ldots, k_{y,ny}$ as $y_{1,k}, \ldots, y_{ny,k}$;

(d) substituting the values of $x_{0,k}, x_{1,k}, \ldots, x_{nx,k}$ and $y_{1,k}, \ldots, y_{ny,k}$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, l \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c$$

to form a quadratic equation for $y_0$; and (e) performing a Legendre test to see if the quadratic equation in $y_0$ has a square root, and if the quadratic equation has a square root, then assigning one of the roots of $y_0$, and if it does not have a square root, then substituting the values $(gx_{0,k}, gx_{1,k}, \ldots, gx_{nx,k})$ and $g^{3/2} y_{1,k}, \ldots, g^{3/2} y_{ny,k}$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, l \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c$$

and solving for the resulting quadratic equation in $y_0$, and assigning one of the roots to $y_0$.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as (d/p). In order to test whether d is quadratic residue or not, the Legendre symbol, (d/p), is computed such that:

$$\left(\frac{d}{p}\right) = \begin{cases} +1 & \text{if } x \text{ is quadratic residue} \\ 0 & \text{if } x = 0 \bmod F(p) \\ -1 & \text{otherwise.} \end{cases}$$

The security of $EC^{nx+ny+2}$ cryptosystems is assessed by both the effect on the solution of the elliptic curve discrete logarithm problem (ECDLP); and power analysis attacks. It is well known that the elliptic curve discrete logarithm problem (ECDLP) is apparently intractable for non-singular elliptic curves. The ECDLP problem can be stated as follows: given an elliptic curve defined over F that need N-bit for the representation of its elements, an elliptic curve point $(x_p, y_p) \in EC^2$ defined in affine coordinates, and a point $(x_Q, y_Q) \in EC^2$ defined in affine coordinates, determine the integer $k, 0 \leq k \leq \#F$, such that $(x_Q, y_Q) = k(x_p, y_p)$ provided that such an integer exist. In what follows, it is assumed that such an integer exists. The apparent intractability of the elliptic curve discrete logarithm problem (ECDLP) is the basis of the security of $EC^{nx+ny+2}$ cryptosystems. It is assumed that a selected elliptic polynomial equation with more than one x-coordinate and one or more y-coordinates for use in a $EC^{nx+ny+2}$ cryptosystem has a surface or hyper-surface that is non-singular. A non-singular surface or hyper-surface is such that the partial first derivatives at any non-trivial point on the surface or hyper-surface are not all equal to zero.

The ECDLP in $EC^{nx+ny+2}$ cryptosystems can be stated as follows: given a point $(x_{0,p}, x_{1,p}, \ldots, x_{nx,p}, y_{0,p}, y_{1,p}, \ldots, y_{ny,p}) \in EC^{nx+ny+2}$ and a point $(x_{0,Q}, x_{1,Q}, \ldots, x_{nx,Q}, y_{0,Q}, y_{1,Q}, \ldots, y_{ny,Q}) \in EC^{nx+ny+2}$, determine an integer $k, 0 \leq k \leq \#F$ such that $(x_{0,Q}, x_{1,Q}, \ldots, x_{nx,Q}, y_{0,Q}, y_{1,Q}, \ldots, y_{ny,Q}) = k(x_{0,p}, x_{1,p}, \ldots, x_{nx,p}, y_{0,p}, y_{1,p}, \ldots, y_{ny,p})$ provided that such an integer exist. The most well known attack used against the ECDLP is Pollard ρ-method, which has a complexity of O($\sqrt{\pi K}/2$), where K is the order of the underlying group and the complexity is measured in terms of an elliptic curve point addition.

In $EC^{nx+ny+2}$ cryptosystems, the modified Pollard ρ-method can be formulated as follows: find two points $$(x_{0,i}, x_{1,i}, \ldots, x_{nx,i}, y_{0,i}, y_{1,i}, \ldots, y_{ny,i}) = A_i(x_{0,Q}, x_{1,Q}, \ldots, x_{nx,Q}, y_{0,Q}, y_{1,Q}, \ldots, y_{ny,Q}) + B_i(x_{0,p}, x_{1,p}, \ldots, x_{nx,p}, y_{0,p}, y_{1,p}, \ldots, y_{ny,p})$$

and $$(x_{0,j}, x_{1,j}, \ldots, x_{nx,j}, y_{0,j}, y_{1,j}, \ldots, y_{ny,j}) = A_j(x_{0,Q}, x_{1,Q}, \ldots, x_{nx,Q}, y_{0,Q}, y_{1,Q}, \ldots, y_{ny,Q}) + B_j(x_{0,p}, x_{1,p}, \ldots, x_{nx,p}, y_{0,p}, y_{1,p}, \ldots, y_{ny,p})$$

such that $$(x_{0,i}, x_{1,i}, \ldots, x_{nx,i}, y_{0,i}, y_{1,i}, \ldots, y_{ny,i}) = (x_{0,j}, x_{1,j}, \ldots, x_{nx,j}, y_{0,j}, y_{1,j}, \ldots, y_{ny,j})$$

and, hence, $$k = \frac{A_i + A_j}{B_i + B_j},$$

and given that all the points are members of $EC^{nx+ny+2}$. It is clear that the complexity of the Pollard ρ-method in $EC^{nx+ny+2}$ cryptosystems defined over F is $O(\sqrt{\pi(\#EC^{nx+ny+2})}/2)$ and where $\#EC^{nx+ny+2}$ is proportional to $\#(F(p))^{nx+ny+1}$ and # denotes the order of a field or group.

Furthermore, the problem is even more difficult with secret key embedding since the point $(x_{0,p},x_{1,p},\ldots,x_{nx,p},y_{0,p},y_{1,p},\ldots,y_{ny,p})$ is blinded because of its dependence on a shared secret key. The attacker only has $k(x_{0,p},x_{1,p},\ldots,x_{nx,p},y_{0,p},y_{1,p},\ldots,y_{ny,p})$ from which to find k and $(x_{0,p},x_{1,p},\ldots,x_{nx,p},y_{0,p},y_{1,p},\ldots,y_{ny,p})$. Clearly this is an undetermined problem. Simple and differential power analysis can be used to attack $EC^{nx+ny+2}$ cryptosystems in a similar manner in which they are used to attack elliptic curve cryptosystems. The countermeasures that are used against simple and differential power analysis for elliptic curve cryptosystems are also applicable for $EC^{nx+ny+2}$ cryptosystems.

As an example, the randomized projective coordinate method can be applied in $EC^{nx+ny+2}$ cryptosystems by randomizing the coordinates of the projective coordinates, that is $$(X_0,X_1,\ldots,X_{nx},Y_0,Y_1,\ldots,Y_{ny},V) = (X_0\lambda^2,X_1\lambda^2,\ldots,X_{nx}\lambda^2,Y_0\lambda^3,Y_1\lambda^3,\ldots,Y_{ny}\lambda^3,V\lambda)$$

where $\lambda$ is a random variable. In elliptic polynomial point addition and point doubling defined previously, they are defined over the entire dimensional space which contains all the (nx+1) x-coordinate and all the (ny+1) y-coordinates. The corresponding scalar multiplication which is implemented as a sequence of point additions and point doublings is therefore defined over the entire dimensional space which contains all the (nx+1) x-coordinate and all the (ny+1) y-coordinates. It is possible, however, to define scalar multiplication over a sub-dimensional space which does not contain all the (nx+1) x-coordinate and all the (ny+1) y-coordinates, but must contain at least one x-coordinate and one y-coordinate. In this case, the corresponding point addition and point doubling are defined in the sub-dimensional space. In this case, the variables that denote the other coordinates that are not contained in the selected sub-dimensional space are considered to be constants.

Furthermore, a sequence of scalar multiplications can also be defined over different sub-dimensional spaces that contains different groupings of the x-coordinate and y-coordinates with the condition that each sub-dimensional space contains at least one x-coordinate and one-y-coordinate.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of generating a password protocol using elliptic polynomial cryptography, comprising the steps of:

(a) defining a maximum block size that can be embedded into (nx+1) x-coordinates and ny y-coordinates, wherein nx and ny are integers, and setting the maximum block size to be (nx+ny+1)N bits, wherein N is an integer;

(b) a sending correspondent and a receiving correspondent agree upon an elliptic polynomial $EC^{nx+ny+2}$ by agreeing upon the values of nx and ny, and further agree on a set of coefficients $a_{1k},a_{2kl},a_{3k},c_{1lki},c_{2kl},c_{3kli},b_{1l},b_{2lk},b_{3lk},b_{4k}$ & $b_c \in F$, wherein F represents a finite field where the field's elements can be represented in N-bits, the sending and receiving correspondents further agreeing on a base point on an elliptic polynomial $(x_{0,B},x_{1,B},\ldots,x_{nx,B},y_{0,B},y_{1,B},\ldots,y_{ny,B}) \in EC^{xn+ny+2}$, wherein $EC^{nx+ny+2}$ represents the elliptic polynomial, the sending and receiving correspondents further agreeing upon a method that converts a password into a bit string that has an equivalent scalar value, and the sending and receiving correspondents then further agree on the password, which represents a shared secret key for communication;

the sending correspondent then performs the following steps:

(c) converting the password into a bit string by the agreed method and defining an equivalent scalar value $k_U$;

(d) computing a scalar multiplication of the scalar value $k_U$ with the base point $(x_{0,B},x_{1,B},\ldots,x_{nx,B},y_{0,B},y_{1,B},\ldots,y_{ny,B})$ as $(x_{0,C},x_{1,C},\ldots,x_{nx,C},y_{0,C},y_{1,C},\ldots,y_{ny,C})=k_U(x_{0,B},x_{1,B},\ldots,x_{nx,B},y_{0,B},y_{1,B},\ldots,y_{ny,B})$, wherein $(x_{0,C},x_{1,C},\ldots,x_{nx,C},y_{0,C},y_{1,C},\ldots,y_{ny,C})$ is a cipher point;

(e) sending appropriate bits of the x-coordinates and of the y-coordinates of the cipher point $(x_{0,C},x_{1,C},\ldots,x_{nx,C},y_{0,C},y_{1,C},\ldots,y_{ny,C})$ to the receiver;

the receiving correspondent then performs the following steps:

(f) converting the password into a bit string by the agreed upon method and defining an equivalent scalar value $k_{US}$;

(g) computing a scalar multiplication of the scalar value $k_{US}$ with the base point $(x_{0,B},x_{1,B},\ldots,x_{nx,B},y_{0,B},y_{1,B},\ldots,y_{ny,B})$ as $(x_{0,SC},x_{1,SC},\ldots,x_{nx,SC},y_{0,SC},y_{1,SC},\ldots,y_{ny,SC})=k_{US}(x_{0,B},x_{1,B},\ldots,x_{nx,B},y_{0,B},y_{1,B},\ldots,y_{ny,B})$; and comparing $(x_{0,SC},x_{1,SC},\ldots,x_{nx,SC},y_{0,SC},y_{1,SC},\ldots,y_{ny,SC})$ and $(x_{0,C},x_{1,C},\ldots,x_{nx,C},y_{0,C},y_{1,C},\ldots,y_{ny,C})$ and if $(x_{0,SC},x_{1,SC},\ldots,x_{nx,SC},y_{0,SC},y_{1,SC},\ldots,y_{ny,SC})$ is equal to $(x_{0,C},x_{1,C},\ldots,x_{nx,C},y_{0,C},y_{1,C},\ldots,y_{ny,C})$ then authenticating the user, wherein if $(x_{0,SC},x_{1,SC},\ldots,x_{nx,SC},y_{0,SC},y_{1,SC},\ldots,y_{ny,SC})$ is not equal to $(x_{0,C},x_{1,C},\ldots,x_{nx,C},y_{0,C},y_{1,C},\ldots,y_{ny,C})$, then denying access.

2. A computerized method of generating a password protocol using elliptic polynomial cryptography, comprising the steps of:

(a) defining a maximum block size that can be embedded into (nx+1) x-coordinates and ny y-coordinates, wherein nx and ny are integers, and setting the maximum block size to be (nx+ny+1)N bits, wherein N is an integer;

(b) a sending correspondent and a receiving correspondent agree upon an elliptic polynomial $EC^{nx+ny+2}$ by agreeing upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$, wherein $EC^{nx+ny+2}$ represents the elliptic polynomial, the sending and receiving correspondents further agreeing upon a method that converts a password into a bit string that has an equivalent scalar value, and the sending and receiving correspondents then further agree on the password, which represents a shared secret key for communication;

the sending correspondent then performs the following steps:

(c) converting the password into a secret bit string $k_p$ by the agreed upon method;

(d) dividing the secret bit string $k_p$ into (nx+ny+2) binary sub-strings, $k_{x,0}, k_{x,1}, \ldots, k_{x,nx}, k_{y,0}, k_{y,1}, \ldots, k_{y,ny}$;

(e) embedding the secret sub-string $k_{x,0}, k_{x,1}, \ldots, k_{x,nx}, k_{y,1}, \ldots, k_{y,ny}$ into the (nx+1) x-coordinates and the ny y-coordinates, wherein the resultant point satisfies the elliptic polynomial to obtain a password embedded point $(x_{0,P}, x_{1,P}, \ldots, x_{nx,P}, y_{0,P}, y_{1,P}, \ldots, y_{ny,P})$, the password embedded point being an elliptic point;

(f) computing a scalar multiplication of a scalar value $k_{y,0}$ with the password embedded point as $(x_{0,P}, x_{1,P}, \ldots, x_{nx,P}, y_{0,P}, y_{1,P}, \ldots, y_{ny,P})$ as $(x_{0,C}, x_{1,C}, \ldots, x_{nx,C}, y_{0,1}, y_{1,C}, \ldots, y_{ny,C}) = k_{y,0}(x_{0,P}, x_{1,P}, \ldots, x_{nx,P}, y_{0,P}, y_{1,P}, \ldots, y_{ny,P})$, wherein $(x_{0,C}, x_{1,C}, \ldots, x_{nx,C}, y_{0,C}, y_{1,C}, \ldots, y_{ny,C})$ is a cipher point;

(g) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver;

the receiving correspondent then performs the following steps:

(h) converting the password into a secret bit string $k_{Sp}$ by the agreed upon method;

(i) dividing the secret bit string $k_{Sp}$ into (nx+ny+2) binary sub-strings, $k_{Sx,0}, k_{Sx,1}, \ldots, k_{Sx,nx}, k_{Sy,0}, k_{Sy,1}, \ldots, k_{Sy,ny}$;

(j) embedding the secret sub-string $k_{Sx,0}, k_{Sx,1}, \ldots, k_{Sx,nx}, k_{Sy,0}, k_{Sy,1}, \ldots, k_{Sy,ny}$ into the (nx+1) x-coordinates and the ny y-coordinates, wherein the resultant point satisfies the elliptic polynomial to obtain a password embedded point $(x_{0,SP}, x_{1,SP}, \ldots, x_{nx,SP}, y_{0,SP}, y_{1,SP}, \ldots, y_{ny,SP})$, the password embedded point being an elliptic polynomial point;

(k) computing a scalar multiplication of a scalar value $k_{Sy,0}$ with the password embedded point $(x_{0,SP}, x_{1,SP}, \ldots, x_{nx,SP}, y_{0,SP}, y_{1,SP}, \ldots, y_{ny,SP})$ as $(x_{0,SC}, x_{1,SC}, \ldots, x_{nx,SC}, y_{0,SC}, y_{1,SC}, \ldots, y_{ny,SC}) = k_{Sy,0}(x_{0,SP}, x_{1,SP}, \ldots, x_{nx,SP}, y_{0,SP}, y_{1,SP}, \ldots, y_{ny,SP})$; and (l) comparing $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$ and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$ then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$, then denying access.

3. The computerized method of generating a password protocol using elliptic polynomial cryptography as recited in claim 2, wherein the step of embedding includes the steps of:

(a) dividing a bit string into (nx+ny+1) bit strings $k_{x,0}, k_{x,1}, \ldots, k_{x,nx}, k_{y,1}, \ldots, k_{y,ny}$;

(b) assigning the value of the bit strings of $k_{x,0}, k_{x,1}, \ldots, k_{x,nx}$ as $x_{0,k}, x_{1,k}, \ldots, x_{nx,k}$;

(c) assigning the value of the bit strings of $k_{y,1}, \ldots, k_{k,ny}$ as $y_{1,k}, \ldots, y_{ny,k}$;

(d) substituting the values of $x_{0,k}, x_{1,k}, \ldots, k_{nx,k}$ and $y_{1,k}, \ldots, y_{ny,k}$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, l \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l, k \in S_{nx}, l \neq k} b_{2lk} x_l^2 x_k + \sum_{l, k \in S_{nx}} b_{3lk} x_l x_k + \sum_{k \in S_{nx}} b_{4k} x_k + b_c$$

to form a quadratic equation for $y_0$; and (e) performing a Legendre test to see if the quadratic equation in $y_0$ has a square root, and if the quadratic equation has a square root, then assigning one of the roots of $y_0$, and if it does not have a square root, then substituting the values $(gx_{0,k}, gx_{1,k}, \ldots, gx_{nx,k})$ and $(g^{3/2} y_{1,k}, \ldots, g^{3/2} y_{ny,k})$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, l \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l, k \in S_{nx}, l \neq k} b_{2lk} x_l^2 x_k + \sum_{l, k \in S_{nx}} b_{3lk} x_l x_k + \sum_{k \in S_{nx}} b_{4k} x_k + b_c$$

and solving for the resulting quadratic equation in $y_0$, and assigning one of the roots to $y_0$.

4. A computerized method of generating a password protocol using elliptic polynomial cryptography, comprising the steps of:

(a) defining a maximum block size that can be embedded into (nx+1) x-coordinates and ny y-coordinates, wherein nx and ny are integers, and setting the maximum block size to be (nx+ny+1)N bits, wherein N is an integer;

(b) a sending correspondent and a receiving correspondent agree upon an elliptic polynomial $EC^{nx+ny+2}$ by agreeing upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$, wherein $EC^{nx+ny+2}$ represents the elliptic polynomial, the sending and receiving correspondents further agreeing upon a method that converts a password into a bit string that has an equivalent scalar value, and the sending and receiving correspondents then further agree on the password, which represents a shared secret key for communication;

the sending correspondent then performs the following steps:

(c) converting the password into a secret bit string $k_U$;

(d) dividing the secret bit string $k_U$ into (nx+ny+3) binary sub-strings, $k_{Ux,0}, k_{Ux,1}, \ldots, k_{Ux,nx}, k_{Uy,1}, \ldots, k_{Uy,ny}$ and $k_{U1}, k_{U2}$;

(e) embedding the secret sub-string $k_{Ux,0}, k_{Ux,1}, \ldots, k_{Ux,nx}, k_{Uy,1}, \ldots, k_{Uy,ny}$ into the (nx+1) x-coordinates and the ny y-coordinates, wherein the resultant point satisfies the elliptic polynomial to obtain a password embedded point $(x_{0,U}, x_{1,U}, \ldots, x_{nx,U}, y_{0,U}, y_{1,U}, \ldots, y_{ny,U})$, the password embedded point being an elliptic polynomial point;

(f) computing a scalar multiplication of a scalar value $k_{U1}$ with the base point, $(x_{0,B}, x_{1,B}, \ldots, x_{nx,B}, y_{0,B}, y_{1,B}, \ldots, y_{ny,B})$, and the scalar value, $k_{U2}$, with the user point, $(x_{0,U}, x_{1,U}, \ldots, x_{nx,U}, y_{0,U}, y_{1,U}, \ldots, y_{ny,U})$, as $$(x_{0,C}, x_{1,C} \ldots, x_{nx,C}, y_{0,C}, y_{1,C} \ldots, y_{ny,C}) =$$
$$k_{U1}(x_{0,B}, x_{1,B}, \ldots, x_{nx,B}, y_{0,B}, y_{1,B}, \ldots, y_{ny,B}) + k_{U2}$$
$$(x_{0,U}, x_{1,U}, \ldots, x_{nx,U}, y_{0,U}, y_{1,U}, \ldots, y_{ny,U})$$

wherein $(x_{0,C}, x_{1,C}, \ldots, x_{nx,C}, y_{0,C}, y_{1,C}, \ldots, y_{ny,C})$ is a cipher point; and (g) sending appropriate bits of the x-coordinates and of the y-coordinates of the cipher point $(x_{0,C}, x_{1,C}, \ldots, x_{nx,C}, y_{0,C}, y_{1,C}, \ldots, y_{ny,C})$ to the receiver;

the receiving correspondent then performs the following steps:

(h) converting the password into a bit string $k_{US}$ using the agreed upon method;

(i) dividing the secret key string $k_{Sp}$ into (nx+ny+3) binary sub-strings $k_{USx,0}, k_{USx,1}, \ldots, k_{USx,nx}, k_{USy,1}, \ldots, k_{USy,ny}$ and $k_{US1}, k_{US2}$;

(j) embedding the secret sub-string $k_{USx,0}, k_{USx,1}, \ldots, k_{USx,nx}, k_{USy,1}, \ldots, k_{USy,ny}$ into the (nx+1) x-coordinates and the ny y-coordinates, wherein the resultant point satisfies the elliptic polynomial to obtain a password embedded point $(x_{0,US}, x_{1,US}, \ldots, x_{nx,US}, y_{0,US}, y_{1,US}, \ldots, y_{ny,US})$, the password embedded point being an elliptic polynomial point;

(k) computing a scalar multiplication of the scalar value $k_{US1}$ with the base point $(x_{0,B}, x_{1,B}, \ldots, x_{nx,B}, y_{0,B}, y_{1,B}, \ldots, y_{ny,B})$, and computing a scalar multiplication of the scalar value $k_{US2}$ with the user point $(x_{0,US}, x_{1,US}, \ldots, x_{nx,US}, y_{0,US}, y_{1,US}, \ldots, y_{ny,US})$ to compute the point $(x_{0,SC}, x_{1,SC}, \ldots, x_{nx,SC}, y_{0,SC}, y_{1,SC}, \ldots, y_{ny,SC})$ as $$(x_{0,SC}, x_{1,SC} \ldots, x_{nx,SC}, y_{0,SC}, y_{1,SC} \ldots, y_{ny,SC}) =$$
$$k_{U1}(x_{0,B}, x_{1,B}, \ldots, x_{nx,B}, y_{0,B}, y_{1,B}, \ldots, y_{ny,Bu}) +;$$
and
$$k_{U2}(x_{0,US}, x_{1,US}, \ldots, x_{nx,US}, y_{0,US}, y_{1,US}, \ldots, y_{ny,US})$$

(l) comparing and $(x_{0,SC}, x_{1,SC}, \ldots, x_{nx,SC}, y_{0,SC}, y_{1,SC}, \ldots, y_{ny,SC})$ and $(x_{0,C}, x_{1,C}, \ldots, x_{nx,C}, y_{0,C}, y_{1,C}, \ldots, y_{ny,C})$ and if $(x_{0,SC}, x_{1,SC}, \ldots, x_{nx,SC}, y_{0,SC}, y_{1,SC}, \ldots, y_{ny,SC})$ is equal to $(x_{0,C}, x_{1,C}, \ldots, x_{nx,C}, y_{0,C}, y_{1,C}, \ldots, y_{ny,C})$ then authenticating the user, wherein if $(x_{0,SC}, x_{1,SC}, \ldots, x_{nx,SC}, y_{0,SC}, y_{1,SC}, \ldots, y_{ny,SC})$ is not equal to $(x_{0,C}, x_{1,C}, \ldots, x_{nx,C}, y_{0,C}, y_{1,C}, \ldots, y_{ny,C})$, then denying access.

5. The computerized method of generating a password protocol using elliptic polynomial cryptography as recited in claim 4, wherein the step of embedding includes the steps of:

(a) dividing a bit string into (nx+ny+1) bit strings $k_{x,0}, k_{x,1}, \ldots, k_{x,nx}, k_{y,1}, \ldots, k_{y,ny}$;

(b) assigning the value of the bit strings of $k_{x,0}, k_{x,1}, \ldots, k_{x,nx}$ as $x_{0,k}, x_{1,k}, \ldots, x_{nx,k}$;

(c) assigning the value of the bit strings of $k_{y,1}, \ldots, k_{k,ny}$ as $y_{1,k}, \ldots, y_{ny,k}$;

(d) substituting the values of $x_{0,k}, x_{1,k}, \ldots, x_{nx,k}$ and $y_{1,k}, \ldots, y_{ny,k}$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, i \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c$$

to form a quadratic equation for $y_0$; and (e) performing a Legendre test to see if the quadratic equation in $y_0$ has a square root, and if the quadratic equation has a square root, then assigning one of the roots of $y_0$, and if it does not have a square root, then substituting the values $(gx_{0,k}, gx_{1,k}, \ldots, gx_{nx,k})$ and $(g^{3/2} y_{1,k}, \ldots, g^{3/2} y_{ny,k})$ in $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$\sum_{k,l \in S_{ny}, i \in S_{nx}} c_{1kli} y_k y_l x_i + \sum_{k \in S_{ny}, i \in S_{nx}} c_{2kl} y_k x_l + \sum_{k \in S_{ny}, l, i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c$$

and solving for the resulting quadratic equation in $y_0$, and assigning one of the roots to $y_0$.

* * * * *